United States Patent
Nguyen

(10) Patent No.: US 8,820,444 B2
(45) Date of Patent: Sep. 2, 2014

(54) ELECTRIC VEHICLE HAVING EXCHANGEABLE BATTERY MODULES AND METHOD OF RESUPPLY THEREFOR

(76) Inventor: Tuan Nguyen, Tustin, CA (US)

( * ) Notice: Subject to any disclaimer, the term of this patent is extended or adjusted under 35 U.S.C. 154(b) by 470 days.

(21) Appl. No.: 12/761,886

(22) Filed: Apr. 16, 2010

(65) Prior Publication Data

US 2010/0230188 A1    Sep. 16, 2010

(51) Int. Cl.
*B60K 1/00* (2006.01)
*B60W 10/24* (2006.01)
*B60L 11/18* (2006.01)
*B60S 5/06* (2006.01)

(52) U.S. Cl.
CPC ............ *B60S 5/06* (2013.01); *Y02T 10/7072* (2013.01); *Y02T 90/14* (2013.01); *B60L 11/1822* (2013.01); *Y02T 90/124* (2013.01); *B60L 2200/36* (2013.01); *Y02T 10/7005* (2013.01)
USPC ...................................... 180/65.1; 180/65.29

(58) Field of Classification Search
USPC ............. 180/65.1, 65.21, 65.27, 65.29, 68.5, 180/207.1, 207.3; 701/22; 320/104, 109; 318/139; 340/455, 636.1
See application file for complete search history.

(56) References Cited

U.S. PATENT DOCUMENTS

| | | | | | |
|---|---|---|---|---|---|
| 3,387,194 | A | * | 6/1968 | Banks | 318/139 |
| 3,718,848 | A | * | 2/1973 | Hines | 320/117 |
| 3,799,063 | A | * | 3/1974 | Reed | 180/65.1 |
| 3,923,116 | A | * | 12/1975 | Thomspon et al. | 180/65.8 |
| 3,983,952 | A | * | 10/1976 | McKee | 280/778 |
| 4,075,541 | A | * | 2/1978 | Shibata et al. | 318/139 |
| 4,087,895 | A | * | 5/1978 | Etienne | 29/252 |
| 4,277,737 | A | * | 7/1981 | Muller-Werth | 320/127 |
| 4,532,418 | A | * | 7/1985 | Meese et al. | 235/381 |
| 4,580,081 | A | * | 4/1986 | Krueger et al. | 318/139 |
| 5,121,046 | A | * | 6/1992 | McCullough | 320/117 |
| 5,157,319 | A | * | 10/1992 | Klontz et al. | 320/108 |
| 5,373,910 | A | * | 12/1994 | Nixon | 180/65.1 |
| 5,542,488 | A | * | 8/1996 | Nixon | 180/65.1 |
| 5,549,443 | A | | 8/1996 | Hammerslag | 414/809 |

(Continued)

*Primary Examiner* — J. Allen Shriver, II
*Assistant Examiner* — James M Dolak
(74) *Attorney, Agent, or Firm* — Steins & Associates, P.C.

(57) ABSTRACT

An Electric Vehicle Having Exchangeable Battery Modules and Method of Resupply Therefor. The device of the present invention is a electrically-powerable vehicle that provides the user with a usage pattern very similar to one experienced through use of an internal-combustion-powered vehicle. That is to say that the operating cost for the vehicle is "pay as you go," rather than the user needing to pay an exorbitant up-front fee in order to purchase the vehicle. In order to accomplish this, the battery modules for use in the vehicle are exchangable by an individual driver. As a battery module becomes discharged, the user is able to visit a recharging station and exchange his or her discharged battery module with a fully charged module. The user is then be charged an amount that is relative to the number of exchanges and/or re-charge energy consumed. In order to enable this sort of system, and the battery modules are of standard size, and interface with a module tracking and monitoring system. The vehicle purchaser is able to purchase a vehicle without purchasing the battery modules, and then simply rent or lease the battery modules, as desired. Finally, the vehicle has an internal power mode selector switch system that permits the user to select different circuitry alignments for the power being supplied by the battery modules, including parallel, serial and individual. This allows the driver to control the trip length and our propulsion power available to the driver.

11 Claims, 8 Drawing Sheets

(56) References Cited

U.S. PATENT DOCUMENTS

| | | | |
|---|---|---|---|
| 5,585,205 A * | 12/1996 | Kohchi | 429/99 |
| 5,612,606 A * | 3/1997 | Guimarin et al. | 320/109 |
| 5,620,057 A * | 4/1997 | Klemen et al. | 180/68.5 |
| 5,711,648 A | 1/1998 | Hammerslag | 414/800 |
| 5,760,569 A * | 6/1998 | Chase, Jr. | 320/104 |
| 5,927,938 A * | 7/1999 | Hammerslag | 414/809 |
| 5,951,229 A * | 9/1999 | Hammerslag | 414/398 |
| 5,960,898 A * | 10/1999 | Okada et al. | 180/65.8 |
| 5,998,963 A * | 12/1999 | Aarseth | 320/109 |
| 6,014,597 A * | 1/2000 | Kochanneck | 320/109 |
| 6,057,670 A * | 5/2000 | Sink et al. | 320/117 |
| 6,094,028 A * | 7/2000 | Gu et al. | 320/109 |
| 6,614,204 B2 * | 9/2003 | Pellegrino et al. | 320/109 |
| 6,919,707 B2 * | 7/2005 | Kawai et al. | 320/117 |
| 6,930,404 B1 * | 8/2005 | Gale et al. | 290/40 C |
| 6,984,946 B2 * | 1/2006 | Donnelly et al. | 318/139 |
| 7,075,194 B2 * | 7/2006 | Weidenheimer et al. | 180/65.1 |
| 7,201,384 B2 * | 4/2007 | Chaney | 180/68.5 |
| 7,489,048 B2 * | 2/2009 | King et al. | 307/10.1 |
| 7,520,355 B2 * | 4/2009 | Chaney | 180/68.5 |
| 7,692,404 B2 * | 4/2010 | Harris | 320/117 |
| 7,693,609 B2 * | 4/2010 | Kressner et al. | 700/291 |
| 7,792,613 B2 * | 9/2010 | Kressner et al. | 700/296 |
| 7,893,561 B2 * | 2/2011 | Weidenheimer et al. | 307/71 |
| 8,100,206 B2 * | 1/2012 | Kressner et al. | 180/65.27 |
| 8,174,238 B2 * | 5/2012 | Badger | 320/117 |
| 8,294,420 B2 * | 10/2012 | Kocher | 320/109 |
| 8,297,686 B2 * | 10/2012 | Redmond | 296/187.02 |
| 8,330,415 B2 * | 12/2012 | Sato et al. | 320/109 |
| 8,417,598 B2 * | 4/2013 | Pinkusevich et al. | 320/109 |
| 8,421,592 B1 * | 4/2013 | Gunasekara et al. | 320/104 |
| 8,452,661 B2 * | 5/2013 | Karch et al. | 320/109 |
| 8,453,773 B2 * | 6/2013 | Hill et al. | 180/65.29 |
| 8,565,930 B2 * | 10/2013 | Miwa | 700/292 |
| 8,583,551 B2 * | 11/2013 | Littrell et al. | 705/40 |
| 8,594,871 B2 * | 11/2013 | Uchida | 701/22 |
| 8,604,751 B2 * | 12/2013 | Mitsutani | 320/109 |
| 8,648,571 B2 * | 2/2014 | Oki | 320/132 |

\* cited by examiner

ELECTRIC VEHICLE HAVING EXCHANGEABLE BATTERY MODULES AND METHOD OF RESUPPLY THEREFOR

BACKGROUND OF THE INVENTION

1. Field of the Invention

This invention relates generally to electrically-powered vehicles and, more specifically, to an Electric Vehicle Having Exchangeable Battery Modules and Method of Resupply Therefor.

2. Description of Related Art

The rate of growth of electric vehicles has become exponential in recent years. With regard to electric passenger cars intended for use on standard vehicle byways, two general classes of vehicle propulsion systems have evolved: pure electric vehicles, and so-called hybrid electric vehicles. The instant invention relates to pure electric vehicles, or vehicles having their propulsion provided only by electric motor and onboard batteries.

Conventional all-electric vehicles differ in sizes, body styles and cost, but there are several elements that are consistently found in all such vehicles:

Cost—rechargeable batteries of the type acceptable for use in electric vehicles are extremely expensive. As a result, most electric vehicles cannot compete with gasoline- or diesel-powered vehicles because the equivalent electric vehicle will cost at least fifty (50) percent more. While the operating cost of an electric vehicle is substantially lower than an internal combustion vehicle, the upfront cost for the conventional all-electric vehicle is so high that the typical user will never reasonably recoup the cost.

Range limitation—while the onboard batteries in the conventional all-electric vehicle will allow the vehicle to achieve highway speeds, their size, weight and cost generally limit the number of batteries that can feasibly be installed within a vehicle. In the case of virtually all conventional all-electric cars, the car will only be able to travel approximately one hundred (100) miles between recharges.

Recharge requirements—the short-range nature of the conventional all-electric vehicle makes it virtually mandatory that the user recharge the vehicle at least daily. A high-power (240 VAC) battery charger can generally give a full charge to the onboard vehicle batteries in less than an hour. The problem is that these types of stations are not the norm—usually the user charges the vehicle at home during the evening. The typical home charging station is 120 VAC, and it will require up to four (4) hours for a full recharge.

Usage pattern—there is a cultural complication related to a user's transition from an internal combustion vehicle to an all-electric vehicle. The driver of an internal combustion engine-powered vehicle can drive virtually as far and as long as they like. Refueling stations are widely available and open for business so that refueling is generally a relatively short pause in any driving trip. In contrast, the short range capacity of the all-electric vehicle, coupled with the need for regular recharging, means that the user of these types of vehicles really has to change the way in which they use the vehicle. The user of the conventional all-electric vehicle must either stick to a confined, regular, short-distance route, since at least an hour recharging session is required for every 100 miles driven.

What is needed is an all-electric vehicle and replenishment system that allows a driver to emulate the driving pattern and ownership cost of an internal combustion engine-powered vehicle without the prohibitively high upfront cost.

SUMMARY OF THE INVENTION

In light of the aforementioned problems associated with the prior devices and methods, it is an object of the present invention to provide an Electric Vehicle Having Exchangeable Battery Modules and Method of Resupply Therefor. The device of the present invention is a electrically-powerable vehicle that should provide the user with a usage pattern very similar to one experienced through use of an internal-combustion-powered vehicle. That is to say that the operating cost for the vehicle should be "pay as you go," rather than needing to pay an exorbitant up-front fee in order to purchase the vehicle. In order to accomplish this, the battery modules for use in the vehicle should be exchangable by an individual driver. As a battery module becomes discharged, the user should be able to visit a recharging station and exchange his or her discharged battery module with a fully charged module. The user should then be charged an amount that is related to the number of exchanges and/or re-charge energy consumed. In order to enable this sort of system, and the battery modules should be of standard size, they should interface with a module tracking and monitoring system. The vehicle purchaser should be able to purchase a vehicle without purchasing the battery modules, and then simply rent or lease the battery modules, as desired. Finally, the vehicle should have an internal power mode selector switch system that permits the user to select different circuitry alignments for the power being supplied by the battery modules, including parallel, serial and individual. This would allow the driver to control the trip length and our propulsion power available to the driver.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an Electric Vehicle Having Exchangeable Battery Modules and Method of Resupply Therefor.

Figure 1:
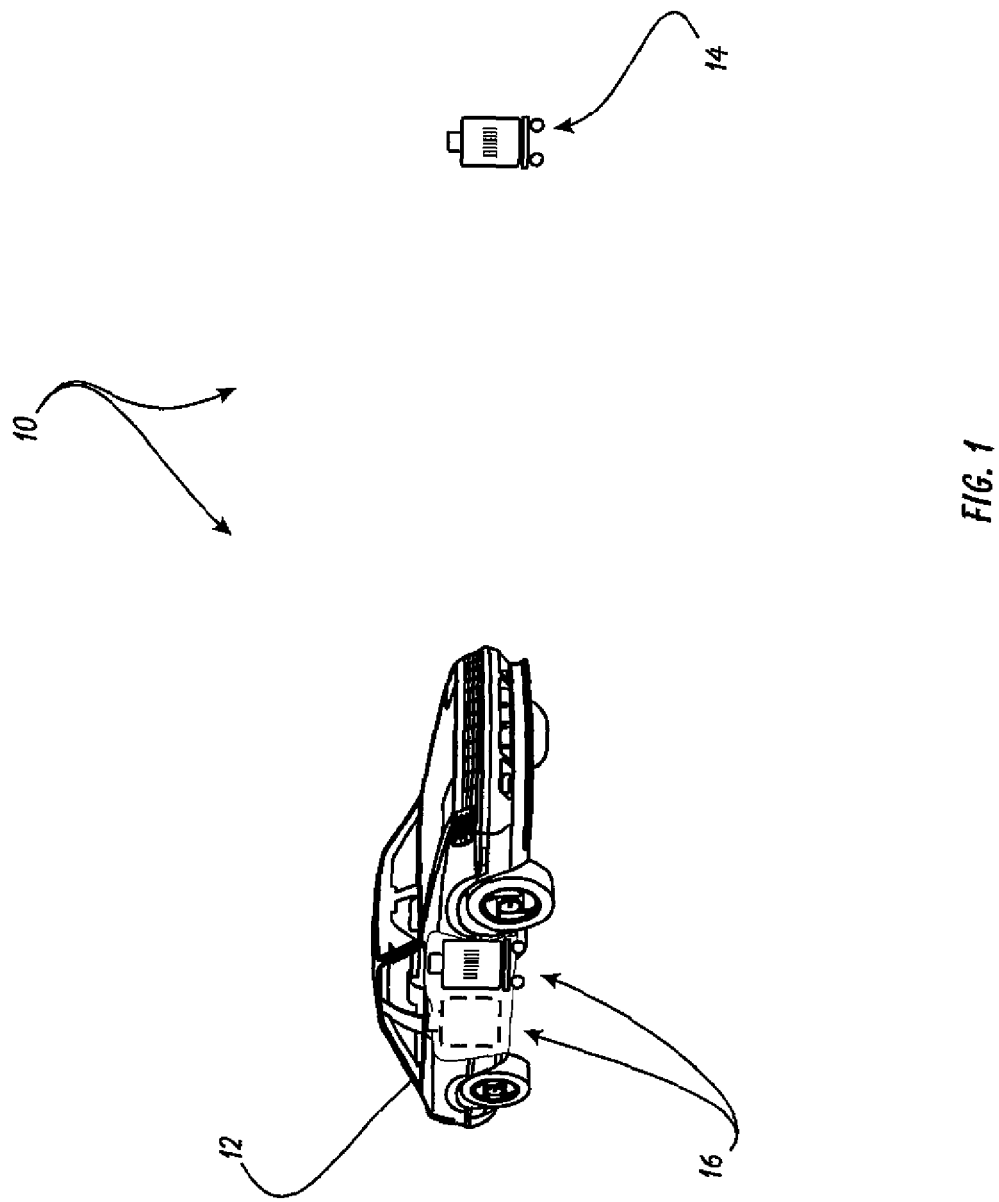
FIG. 1 is a partially exploded side view depicting a preferred embodiment of the electric vehicle having exchangeable battery modules (EVEB) of the present invention.

The present invention can best be understood by initial consideration of FIG. 1. FIG. 1 is a partially exploded side view depicting a preferred embodiment of the electric vehicle having exchangeable battery modules (EVEB) 10 of the present invention. This scene highlights two major distinctions between the electric vehicle, method and system of the present invention and the prior systems discussed previously. The EVEB 10 solves the problems with the prior vehicles by separating the power packs (in this case rechargeable batteries) from the vehicle, thereby allowing the user much more control of his or her usage experience so as to closely emulate the ownership and operation of an internal combusion-powered vehicle.

The vehicle 12 is in many ways identical to a conventional electric vehicle. A critical distinction is that the battery modules 14 can be removed and exchanged by the user. While one or more modules 14 could be exchanged any time, presumably the purpose of the exchange would be to replace a discharged ("empty") module 14 with a fully charged ("full") module 14. The vehicle 12 is provided with a plurality of module receptacles 16 within its chassis—the battery modules 14 are designed to be quickly handled by the driver of the vehicle 12 through the removal and installation steps. As a result, the driver is quickly able to drive away with a set of fully charged batteries without the need for a prolonged recharging period. We will now turn to FIG. 2 to begin to study the internal features of the propulsion system of the EVEB 10.

Figure 2:
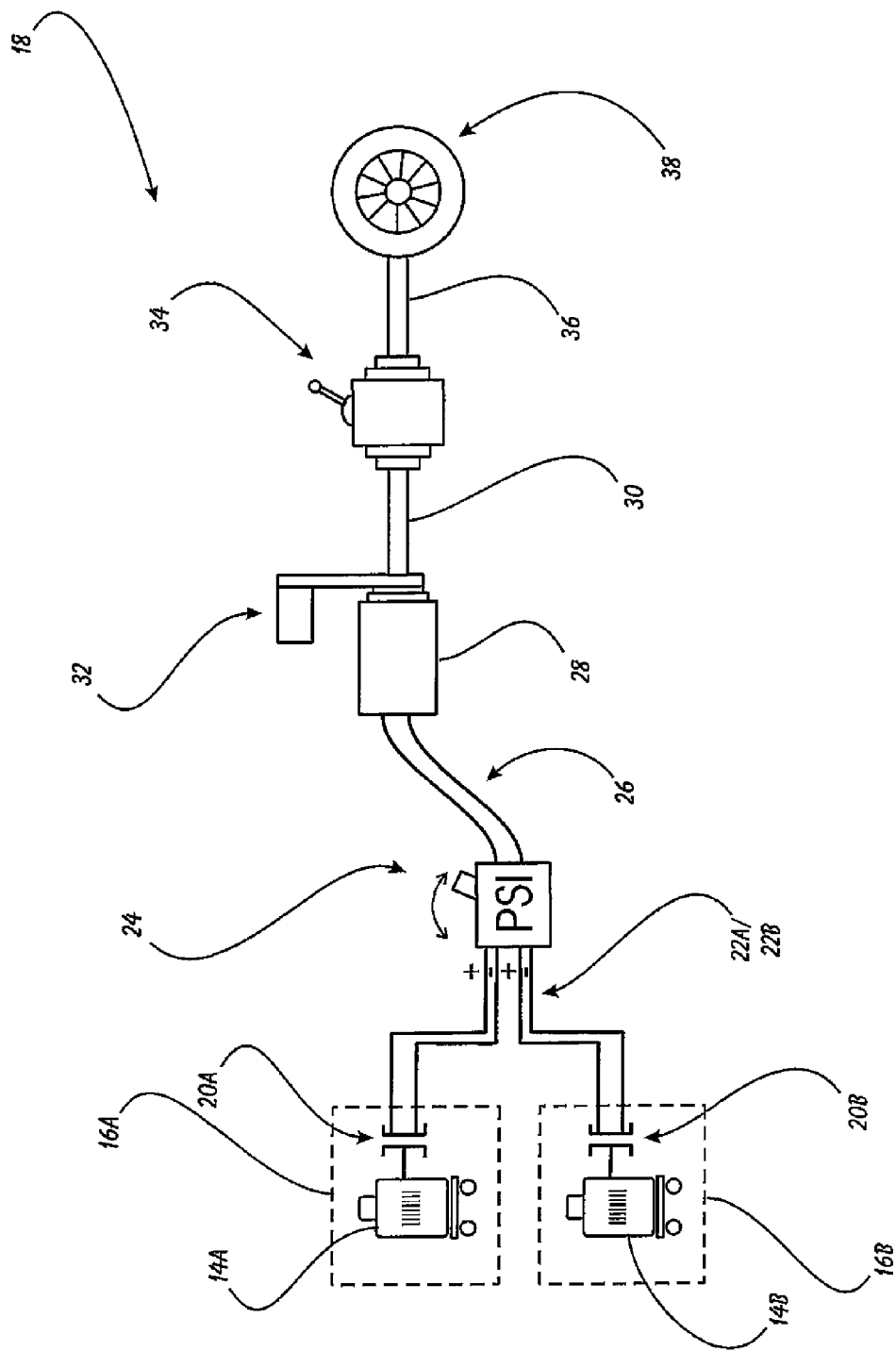
FIG. 2 depicts a preferred embodiment of the propulsion system of the EVEB of FIG. 1.

FIG. 2 depicts a preferred embodiment of the propulsion system 18 of the EVEB of FIG. 1. The usual arrangement for a passenger vehicle would be to have a pair of matching (and standardized) battery modules—first module 14A and second module 14B. Each module is inserted into its respective battery module receptacle 16A, 16B such that the modules 14A, 14B are held securely and safely, and so that there is a positive connection at the power couplings 20A, 20B. The electrical power will feed from each module 14A, 14B through their respective power coupling 20A, 20B to the input leads 22A, 22B (one per battery module 14A, 14B).

The input leads 22A, 22B feed the power mode selector device 24. As will be discussed more fully below in connection with other drawing figures, the power mode selector device 24 is an integral element in the system 18 in order to provide versatility and adaptability never before made available in an electric vehicle.

Figure 3A:
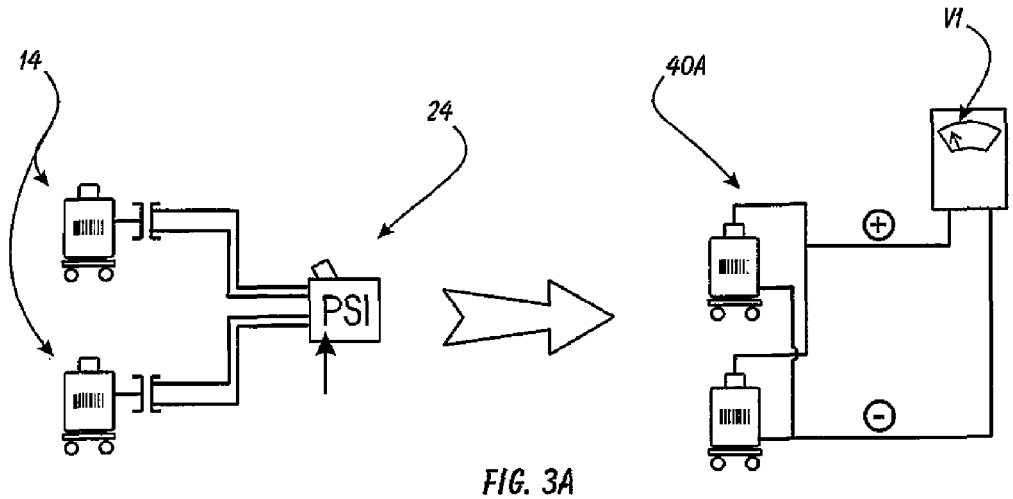
FIGS. 3A-3C are schematic diagrams of the different power modes available for the EVEB of FIGS. 1 and 2.
Figure 3B:
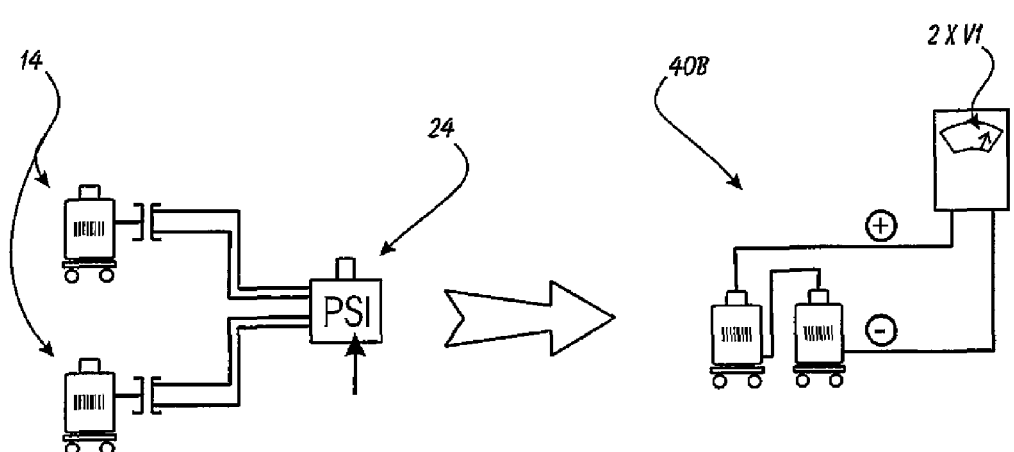
Figure 3C:
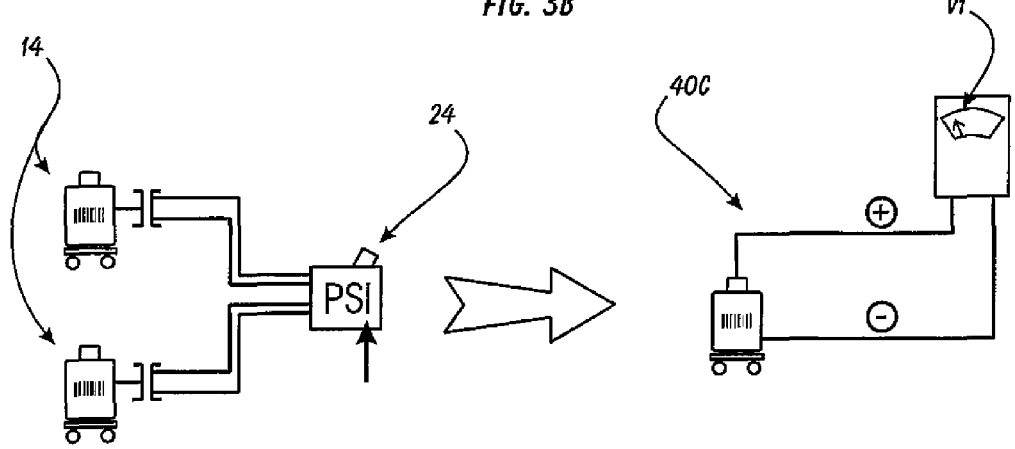

A pair of positive and negative power cables (the output leads 26) transmit power from the power mode selector device 24 to the main electric motor 28 used to propel the vehicle. In this version, a transmission 34 is driven by the motor shaft 30 in order to transmit rotation& force from the electric motor 28 to the drive wheels 38, but this element may be considered to be optional. Since the electric motor 28 is innately controllable, and can reverse direction electrically (rather than mechanically), there may not be a need for the transmission 34, in which case the motor shaft 30 would connect directly to the drive shaft 36. A variety of auxiliary motor systems 32 may also be driven by the main electric motor 28. For example, an air conditioning compressor would generally receive at least part of its input power from the propulsion motor 28 (perhaps while also using electricity to power an internal compressor motor). It should be understood that other elements of the mechanical drive train (other than those shown) may be added to the system, as the depicted system 18 is provided to highlight the major elements that distinguish the instant vehicle and system from the prior art. Turning now to FIGS. 3A-3C, we will discuss the function of the power mode selector device 24.

FIGS. 3A-3C are schematic diagrams of the different power modes available for the EVEB of FIGS. 1 and 2. The power mode selector device 24 allows the driver to change the interconnection configuration of the battery modules to best fit the then-current situation. It is this flexibility that allows the EVEB to fully capitalize on the benefits of the modular battery system.

FIG. 3A depicts a first propulsion power supply configuration 40A. Here, selector device 24 has been placed in the "parallel" position. In the parallel position, output current from the battery modules 14 are arranged in parallel. As shown in the simplified propulsion circuit diagram 40A, the output voltage to the vehicle motor is generally equivalent to V1, or the voltage of one of the modules 14 (or groups of modules) arranged in parallel. If each module 14 produces ninety-six (96) DC volts, then a pair of modules 14 aligned in parallel as shown in 40A will also provide ninety-six DC volts.

From a user's perspective, placing the device 24 in parallel mode will provide less power (translates into vehicle top speed), but will provide extended discharge duration (translates into vehicle driving range). While a vehicle operating in parallel mode might be capable of highway speeds, it would generally be better suited for long-range in-town travel. Higher torque is provided in the series mode, such as might be desired for the hauling of heavy loads or the climbing of steep inclines.

FIG. 3B depicts a second propulsion power supply configuration 40B. Here, the selector device 24 has been placed in "serial" position, such that the two modules 14 are connected in serial (as shown in circuit 40B). In such a configuration, the propulsion system will deliver the sum-total of the voltage in both modules 14 to the electric motor. In this example (96 DCV modules), a vehicle having its power selector device 24 in serial position will generate one hundred and ninety two (192) DC volts. That power configuration will provide the vehicle with supreme top speed capacity, but with more limited driving range.

FIG. 3C depicts a third propulsion power supply configuration 40C. Here, the selector device 24 has been placed in the "individual" position. In certain circumstances, the driver may wish to discharge only a portion of the available battery modules 14. While in this condition, the device 24 will deliver ninety-six DC volts to the electric propulsion motor. Selection of the individual position will allow the user to actually operate the vehicle without a full complement of modules 14, or to prolong the driving range of the vehicle.

Figure 4:
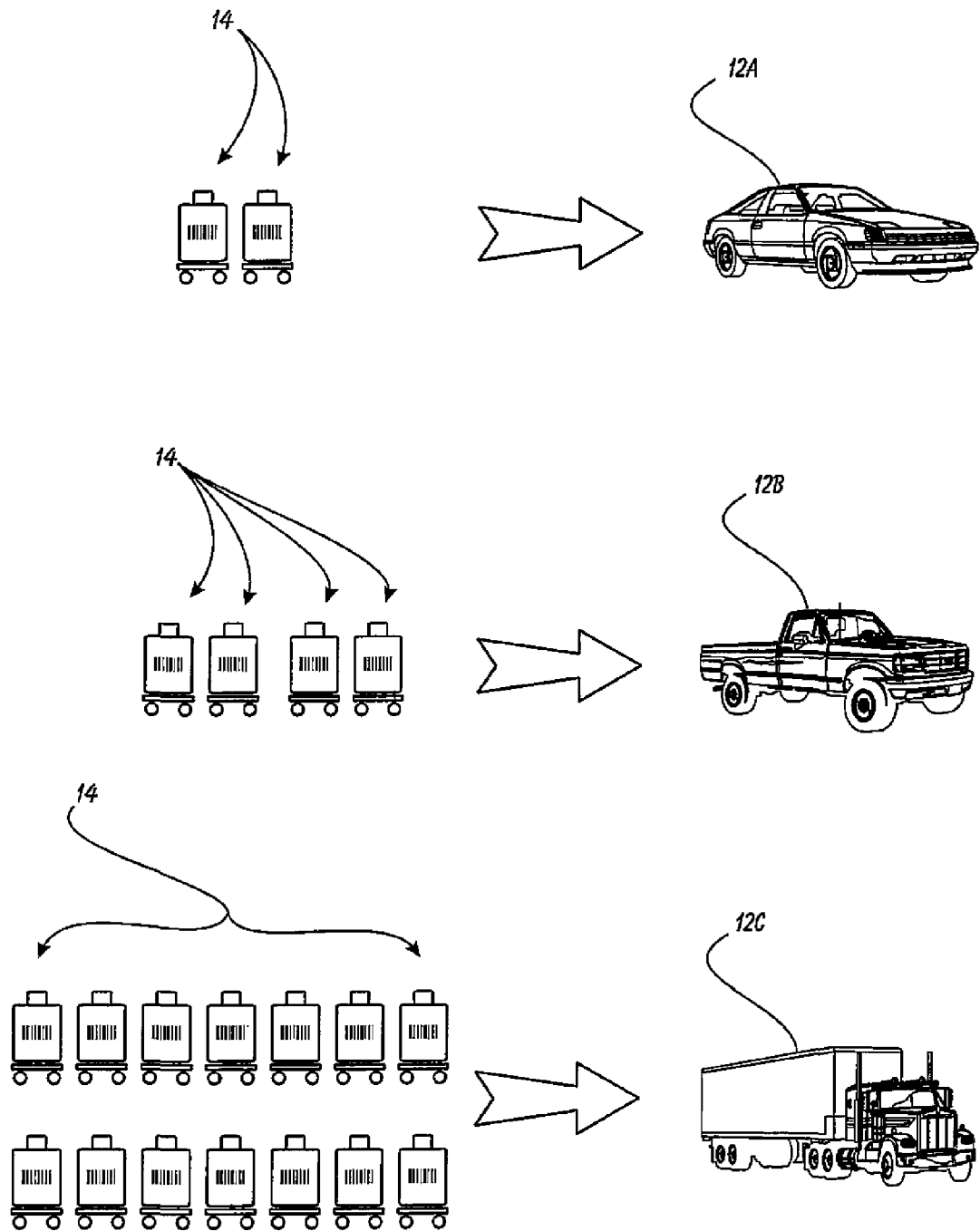
FIG. 4 depicts exemplary EVEB vehicle types.

In the depicted examples, the vehicle has two modules 14, but larger vehicles may have additional modules. In those situations, the selector device 24 may permit a wider variety of power combinations. For example, groups of modules 14 may be aligned in parallel (e.g. three pairs of two modules in parallel). Similarly, different numbers of modules might be arranged in series (e.g. where there are six modules, two-, three-, four-, five- or six-module combinations may be selected). Turning to FIG. 4, we can review a variety of propulsion power configurations.

FIG. 4 depicts exemplary EVEB vehicle types. A small vehicle (e.g. passenger car) 12A may have the capability to carry a pair of battery modules 14 within it. The driver would be able to exchange one or both modules 14 individually, much like a driver of a gasoline-powered vehicle fills the fuel tank with gas.

A mid-size vehicle 12B, such as a utility truck, would be expected to have the space and cargo capacity to handle more batteries than a passenger vehicle. As shown, a utility truck 12B may have two pairs of modules 14. As discussed previously, these modules 14 could be electrically connected in parallel, serial or individual arrangements, or in some hybrid orientation.

Even a large tractor trailer truck 12C could be outfitted with the propulsion system of the present invention. Several standard-sized battery modules 14 would be installed within the appropriate receptacles (see FIG. 1). As with the smaller vehicles previously described, modules 14 are individually exchanged, as desired, to serve the driver's needs. It is noted that in large-capacity vehicles such as these, there may be more than one electric motor devoted to propelling the vehicle (as well as the other auxiliary components). Even where there are multiple drive motors, the system of the present invention will still provide the driver with the power supply combinations discussed above in connection with FIGS. 3A-3C. Now that we have reviewed the basics of the instant concept, we will begin to delve deeper into specific functional and operational facets of the entire exchangeable battery system.

Figure 5:
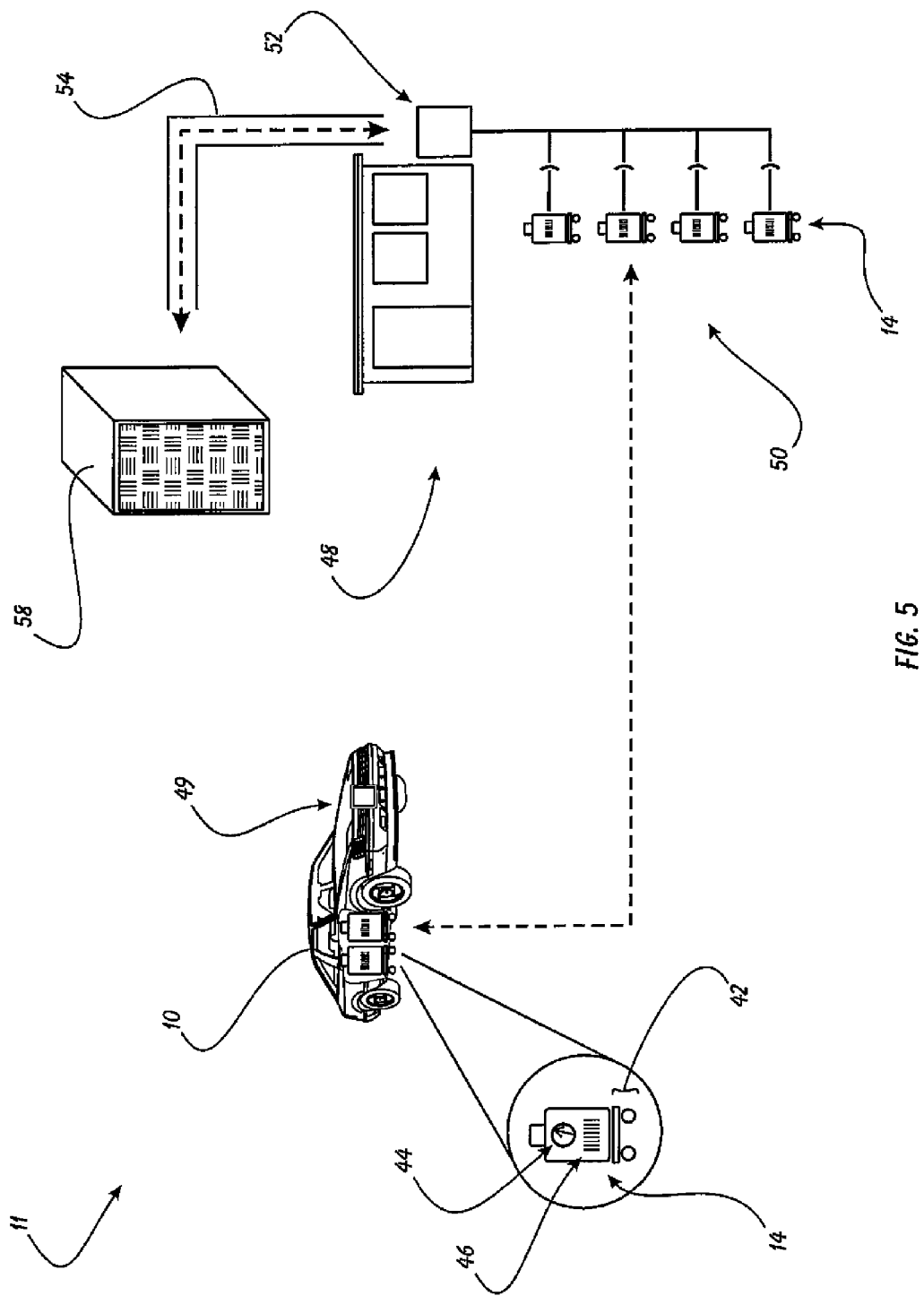
FIG. 5 is a conceptual diagram of the preferred module supply system for the EVEB of the present invention.

FIG. 5 is a conceptual diagram of the preferred module supply system 11 for the EVEB 10 (generically) of the present invention. Each battery module 14 would be selected from a group of standard sizes such that a particular vehicle class would be able to exchange modules 14 with other vehicles in its class. Smaller vehicles may utilize smaller modules 14 than would larger (e.g. commercial) vehicles. Large trucks and the like may utilize larger, high-voltage battery modules 14. In either example, the modules 14 would be selected from a group of standard sized modules so that there is always the ability to share or exchange modules from one vehicle with those of another vehicle (or pool of vehicles).

Each module 14 will typically be made from a group of battery units wired together in series to create the desired size and voltage. The "bundle" of batteries making up the module 14 will be housed together to have a single set of electrical contacts. The module 14 will have a case or rack housing the batteries, and a series of wheels so that the module 14 can easily be transported to and from the vehicle 10. For the purposes of this general disclosure, we will refer to this aspect as a wheeled case 42, since the particular orientation or design of the housing/case may evolve without departing from the spirit of the invention, in that the design will provide the user to exchange modules 42 (which are too heavy to lift manually) without external mechanical assistance.

The modules 14 will preferably include a module status element 44. This element 44 is an associated subsystem which has the purpose of reporting the charge status of the module 14. This will enable the driver and others to determine how full the electrical charge in the module 14 is. The element 44 may further track how many times the module 14 has been discharged and recharged, maintenance status (e.g. maintenance needed or maintenance recorded), and perhaps even the historical usage of the module 14 (vehicles that it has been in, where it has been stored, etc.). Some of this information will be retained elsewhere within the system 11, but it may be tracked within the status element 44 as a backup to other remote systems.

The modules 14 will also preferably include its unique identification within an identity element 46. Each module 14 is provided with a unique identity so that the histories of the individual modules can be kept for the purpose of tracking not only the modules 14 themselves, but also the demand history for modules and other statistical data related to module usage.

The system 11 includes a plurality of exchange stations 48 distributed around geographical areas. Presumably as module demand grows (or growth is predicted), the number and location of exchange stations 48 will also grow. The exchange station 48 is defined by one or more charger controller units 52 for controlling the re-charging of modules 14, the issuance of the fully charged modules 14, and the acceptance of modules 14 needing re-charging. In small-scale installations, the charging bank 50 may only number a handful of modules 14. These sort of stations 48 could piggy-back on existing commercial facilities, such as gas stations, convenience stores and motels, among others. As the size of the charging bank 50 grows, additional dedicated facilities space may be appropriate. It is noted that due to the portability of the modules 14, and the ease of exchange for the drivers, there is supreme flexibility in the potential for exchange stations 48. It is conceived that the hardware portion of the station 48 could be trailer-mounted and simply parked in an empty lot having suitable electrical services to power the charger controller unit 52 and any other related auxiliary systems.

The exchange station 48 and/or charger controller unit 52 is in communication with a remote server 56 over a communications link 54, such as LAN, WAN, cellular, satellite, or other well-known methods of communication. The remote server 56 is a conventional microprocessor-based computing device, including cluster computing and networked computing device. As will be discussed more fully below in connection with subsequent figures, the remote server 56 manages the battery module 14 assets within the system 11, for the purpose of maintaining the operations as well as customer/driver billing.

Figure 6:
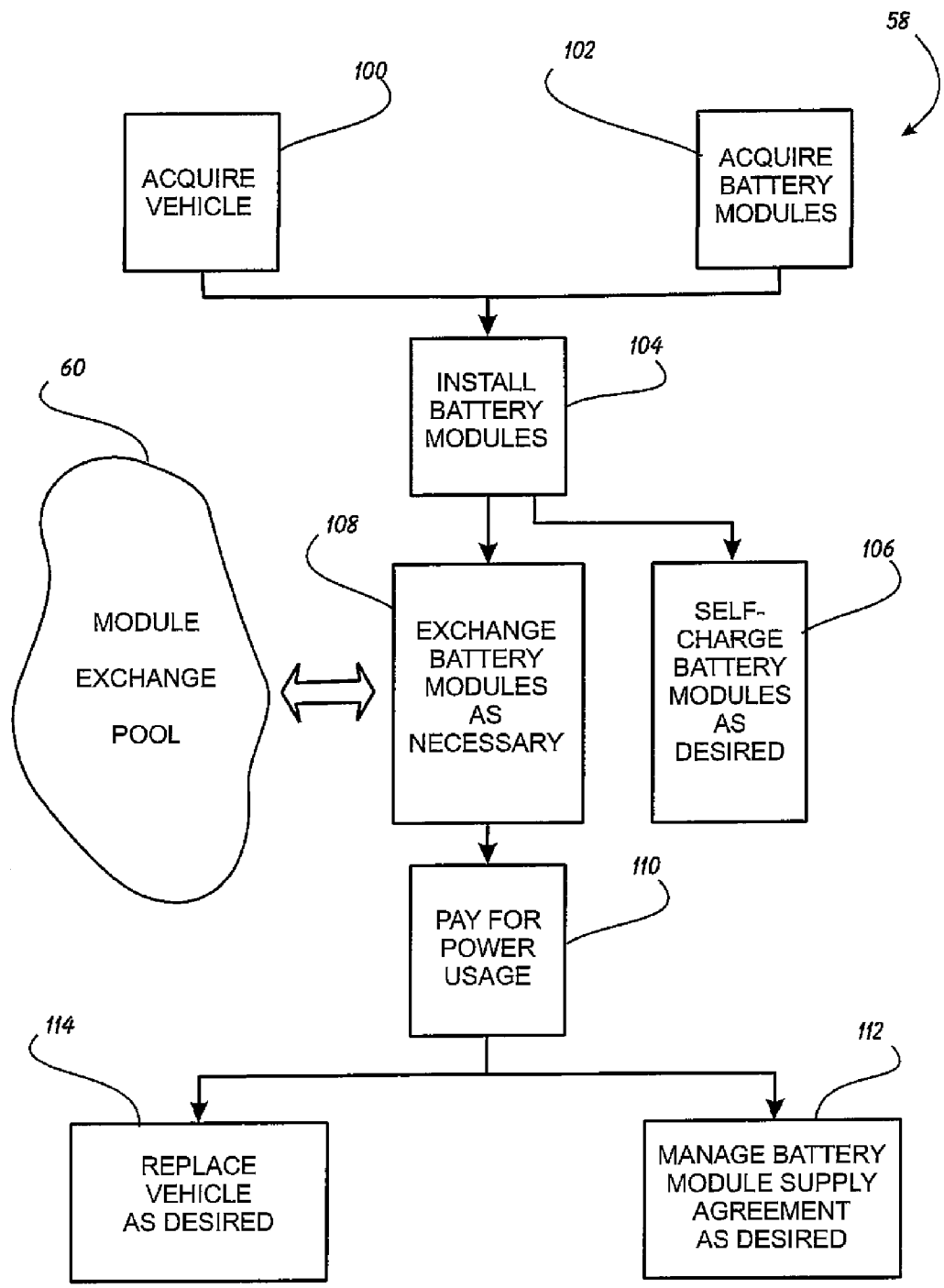
FIG. 6 is a flowchart detailing the preferred module supply method of the present invention.

It is also noted that the EVEB 10 may also be equipped within an internal re-charging system 49. The re-charging system 49 permits the user to charge the internal battery modules 14 by plugging the system 49 into an electrical power source. In some forms, the battery charger may be external to the vehicle 10, in which case the output from the charger would plug into the modules (either individually or as a single "smart" connection). As discussed above in relation to the prior systems, use of the re-charging system will essentially emulate the current "plug-in" electric vehicles, in that a prolonged period of time will be necessary to fully charge the modules 14. The module status element 44 would track such self-charging sessions for the purpose of updating the remote server 56 at such as time as communications are established therewith. FIG. 6 highlights the driver's beneficial experience in owning an EVEB of the present invention, as compared to prior electric car ownership.

FIG. 6 is a flowchart detailing the preferred module supply method 58 of the present invention. Since the battery modules of the present invention are not permanently installed within the EVEB, the mode of usage will differ from a conventional plug-in electric vehicle in many critical ways, as will be discussed herein below.

The vehicle and battery modules are separately acquired 100, 102. The vehicle could be bought, leased or even rented, just as with a prior vehicle type. The difference is that the EVEB vehicle would be expected to be much cheaper than either an equivalent internal combustion engine-powered vehicle because, absent the battery modules, the electric motor and related electric systems are much cheaper as a system than are an internal combustion propulsion system. Furthermore, the expected maintenance costs will be only a fraction of the cost of IC (internal combustion) engines. Of course, absent the cost of the batteries, the EVEB vehicle will be much cheaper than a conventional hybrid or all-electric vehicle, since the battery cost is absent.

The battery modules can be acquired through a wide variety of financial models. Although not likely to be attractive to most buyers, it would be possible to simply purchase the necessary battery modules for the vehicle. It is much more likely that the driver/owner will lease the battery modules under an arrangement that tends to assess charges to the lessee based on the amount that the battery modules are used (i.e. exchanged and/or re-charged). In this manner, the user's costs will be directly related to the amount of use, just as with an IC engine-powered vehicle.

Once acquired, the battery modules are installed in the vehicle 104, and assuming that they hold an electrical charge, the vehicle can be driven. As the electrical charge in the modules is depleted, the user can either self re-charge the modules 106, or exchange the modules 108 through an authorized exchange station. When a user turns in a module, it is entered into pool of exchanged battery modules 60. Likewise, the user then would draw his or her replacement module(s) from the pool 60.

When completing a transaction with the exchange station, the monitoring system (see discussion below in connection with FIGS. 7 and 8) will detect the value of the re-charge(s) (either self-administered, or via exchanged modules), and attribute the cost to the owner/lessee/driver, such that only the power (or module) usage is charged to the driver 110.

Since there is no requirement that the modules stay with the vehicle, or vice-versa, the user can replace the vehicle as desired 114 independently of how he or she manages the battery module supply/agreement 112. Again, this closely emulates the cost attribution for operation of an IC-powered vehicle, and therefore is well-ingrained and understood by the general public (substantially reducing obstacles to the EVEB and associated replenishment method from being accepted). We will begin to delve into the management system for the battery modules by now considering FIG. 7.

Figure 7:
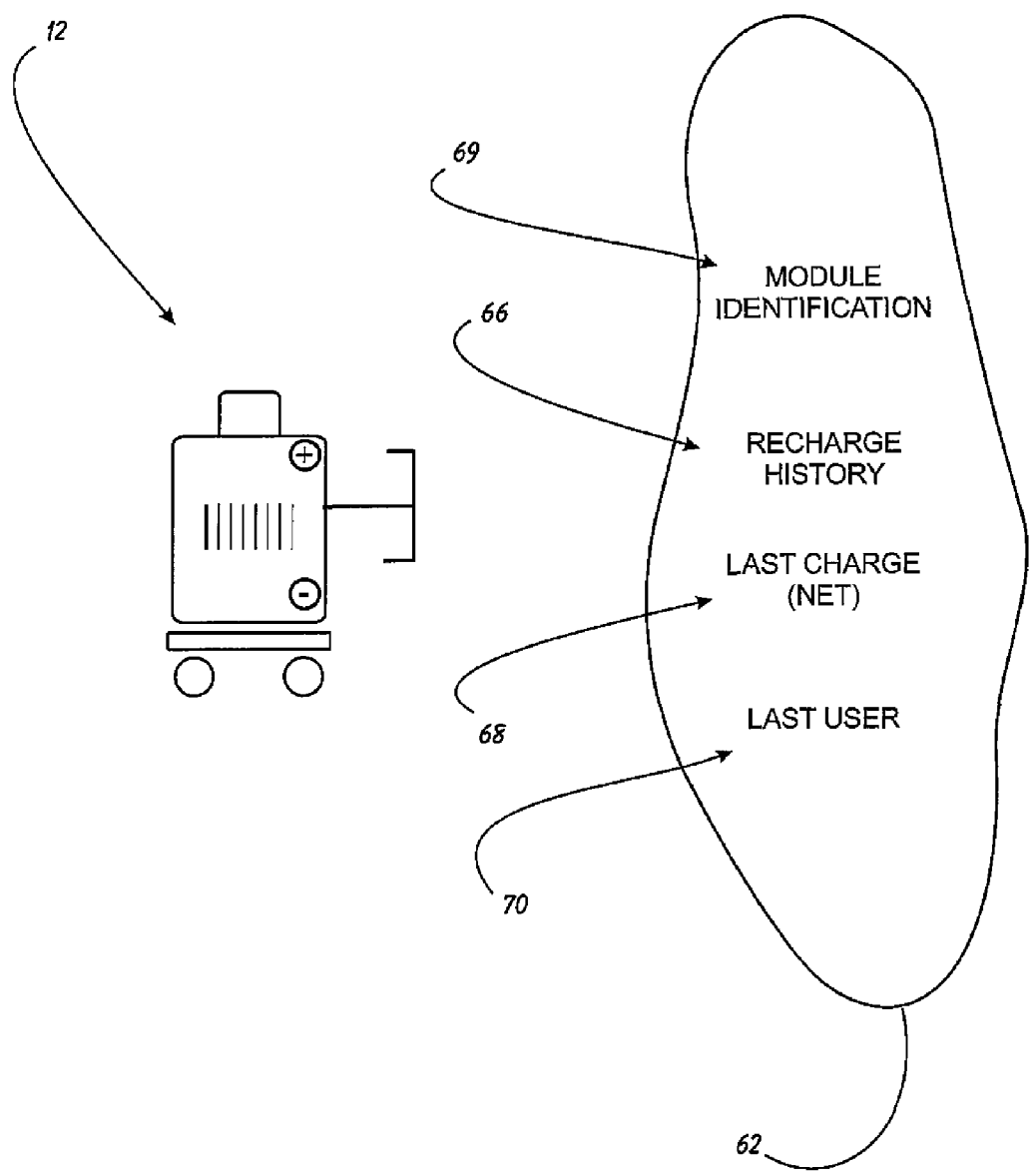
FIG. 7 depicts exemplary data tracked by the module management system of the present invention.

FIG. 7 depicts exemplary data tracked by the module management system 62 of the present invention. Since a significant strength of the instant invention is the ability to "pay-as-you-go" for fuel (electricity) rather than being required to purchase the prohibitively expensive battery modules, it is critical that the disposition and history of the modules 12 is closely tracked so that usage can be attributed to the appropriate owner/lessee.

Figure 8:
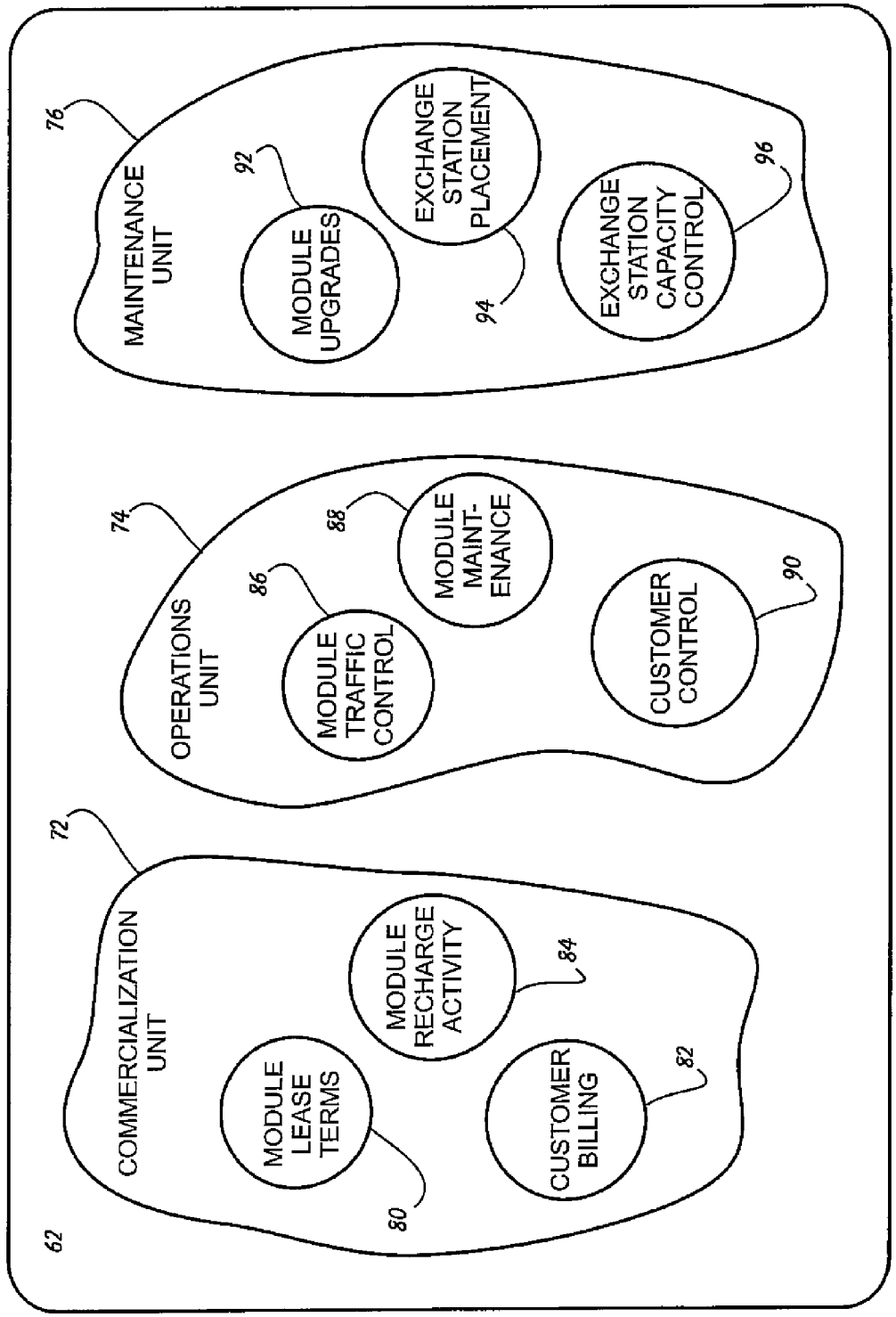
FIG. 8 is a block diagram depicting the functional units making up the module management system of FIG. 7.

Above, the discussion related to FIG. 5 implied that certain internal mechanisms or systems had "brains" to keep track of the usage history of the modules 12. While in some versions this may be the case, other options are also available. For example, the module 12 may only have an unique identifier 64 attached or embedded within it, while some or other of the transactional history of the module 12 is retained within the remote server (see FIG. 5). Here, then, the battery module management system 62 (as maintained on the remote server and other places) is depicted as tracking usage aspects such as the recharge history (including a counter tracking the sequential number of charges) 66 for the individual module 12, the net power quantity used 68 to re-charge the module 12, and the prior user 70 of the module being recharged (in order to correctly attribute the re-charge cost). FIG. 8 elaborates on the features of the system 62.

FIG. 8 is a block diagram depicting the functional units making up the module management system 62 of FIG. 7. The system 62 is preferably comprised of three functional units: the commercialization unit 72, the operations unit 74, and the maintenance unit 76. These units may be contained within the remote server (see FIG. 5), or a series of remote computing devices, or even partially within each battery module (such as the recharge counter). In fact, it may be possible that the modules themselves communicate directly with the remote server and self-report even if not at a re-charge station.

The commercialization unit 72 serves to manage the commercial relationship and transactions between the financial beneficiary of the asset pool of modules and re-charging stations, and the individual user/driver/lessees. The commercialization unit 72 will track recharge activity 84 and apply the terms of the module lease agreements 80 thereto in order to generate appropriate customer billing 82. As discussed previously, a wide variety of financial arrangements are feasible under the system of the present invention, and therefore the lease scenario discussed here is only exemplary of the specific functionality of the commercialization unit 72. The reader is also reminded that the system 62 also keeps track of self-charging sessions for the purpose of customer billing. Cost is proportional to use, or number/quantity of re-charges. Batteries have a finite predicted capacity for reliable re-charges, so each re-charge cycle will reduce the value of the battery. Since self-charges do not use exchange-station-based facilities, it would be expected that the per-cycle charge would be less.

One note regarding the commercial implications on the instant system 62. Financially, separating the batteries from the vehicle opens up a wide variety of options for subscriber/owner/drivers. For example, similar to cellular telephone plans, a driver could choose a prepaid amount of charges, including an unlimited number of re-charges in a particular time period. The larger the prepaid number of re-charges, the less that the "overage" re-charges would be expected to cost. A security deposit would most likely be required for each installed battery module (or module receptacle), but it would be much less than the actual cost of the modules themselves.

The operations unit 74 is responsible for controlling the trafficking of the modules 86. That is to say that the movement of modules to and from vehicles, exchange stations and maintenance/replacement activities is tracked herein. Corrective maintenance 88 to resolve reported operational problems will be triggered and tracked by the operations unit 74. Also, the control of customer usage of modules 90 is effected by the operations unit 74. For example, if a customer's account has become delinquent, module exchanges may be prohibited until the problem is resolved. Or perhaps the customer has not made an exchange for a prolonged period of time, so that the system 62 is uncomfortable with the maintenance status of a particular module. In such a case, the user would be prompted to exchange the questionable module for the purpose of surveillance/verification of operability.

The maintenance unit 76 is responsible for module upgrades/replacements 92, such as the phasing out of old modules and phasing in of new ones. The maintenance unit 76 will also track exchange station usage/demand patterns for the purpose of making recommendations regarding the geographical placement of existing or new module exchange capacity, including the establishing of new exchange stations in underserved areas. Exchange station capacity control 96 is closely related to this analysis—this relates to the increase or decrease of exchange/re-charge capacity at existing exchange stations in response to demand trends.

Finally, it is pointed out that the term "vehicle" as discussed herein is not intended to be limited to those particular examples depicted or discussed. In fact, it is expected that a system such as disclosed herein would be very desirable for airplanes, helicopters, bicycles or motorcycles, boats and virtually any other transportation apparatus.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A motor vehicle, comprising:
   a chassis;
   a propulsion system attached to said chassis, said propulsion system comprising an electric motor operatively connected to drive at least one drive wheel;
   a battery module receptacle attached to said chassis, said battery module receptacle defined by two or more power couplings electrically connected to said propulsion system;
   a power mode selector device electrically connected between said two or more power couplings and said electric motor, said power mode selector device having:
      a series electrical orientation for electrically connecting two or more of said power couplings in series to said electrical motor,
      a parallel electrical orientation for electrically connecting two or more of said power couplings in parallel to said electric motor, and
      an individual electrical orientation for electrically connecting one of said power couplings to said electric motor;
      wherein said power mode selector can selectively connect one, two or more of said power couplings to said electric motor in one of either said series electrical orientation, said parallel electrical orientation, or coupled individually with said electric motor; and
   two or more battery modules selected from a group of battery modules configured to be insertable into said battery module receptacle and removeable therefrom, each battery module establishing electrical connection to one of said power couplings when inserted, each said battery module being interchangable with another battery module from said group; and wherein each battery module comprises a housing encasing a plurality of battery elements electrically interconnected to one another and to a module power coupling, said module power coupling cooperating with said battery module receptacle power coupling to electrically interconnect said power couplings when said module is inserted into said module receptacle, said housing further comprising a set of rollable wheels extending therefrom.

2. The motor vehicle of claim 1, wherein each said battery module is selected from a group of battery modules having a standard size.

3. The motor vehicle of claim 2, further comprising an internal recharging system for recharging each said battery module when said battery module is inserted into said module receptacle.

4. An electric vehicle and battery module supply system therefor, comprising:
   an electrically-propelled vehicle having two or more exchangeable battery modules within a battery module receptacle attached to said vehicle, said vehicle further defined by:
      a power mode selector device electrically connected between said two or more battery modules and said electric motor, said power mode selector device consisting essentially of:
         a series electrical orientation for electrically connecting two or more of said battery modules in series to said electrical motor,
         a parallel electrical orientation for electrically connecting two or more of said battery modules in parallel to said electric motor, and
         an individual electrical orientation for electrically connecting one of said battery modules to said electric motor;
         wherein said power mode selector can selectively connect said battery modules to said electric motor in either said series electrical orientation, said parallel electrical orientation, or said individual electrical orientation;
   a pool of mobile battery modules cooperatively configured to be installable within said receptacles;
   a plurality of module exchange stations for recharging and facilitating the removal and installation of said recharged battery modules within said vehicle said module exchange stations further configured to measure and record the amount of electrical charge remaining in each exchanged said battery module;
   a battery module management system executed on a programmable computing system in communication with said module exchange stations to keep usage records of said battery modules; and
   wherein said battery module management system tracks and computes the number of re-charging steps each said battery module within said pool experiences, and attributes said computed re-charging steps to an identified user to responsively attribute a usage cost to a user that is dependent upon the amount of charge transferred from each said module exchange station to said attributed user, said amount of charge transferred equaling the charge value of a newly installed recharged battery module minus the electrical charge remaining in said exchanged battery module; and wherein each battery module comprises a housing encasing a plurality of battery elements electrically interconnected to one another and to a module power coupling, said module power coupling cooperating with said battery module receptacle power coupling to electrically interconnect said power couplings when said module is inserted into said module receptacle, said housing further comprising a set of rollable wheels extending therefrom.

5. The electric vehicle and battery module supply system therefor of claim 4, wherein said electric vehicle further comprises an internal recharging system for recharging each said battery module when said battery module is inserted into said module receptacle.

6. The motor vehicle of claim 1, wherein each battery module comprises a unique identity element associated therewith.

7. The motor vehicle of claim 6, wherein each said battery module comprises a module status element associated therewith.

8. The motor vehicle of claim 6, wherein each said battery module comprises a module status element associated therewith.

9. The electric vehicle and battery module supply system therefor of claim 4, wherein each battery module comprises a module status element associated therewith.

10. The electric vehicle and battery module supply system therefor of claim 9, wherein each said battery module comprises a module status element associated therewith.

11. The electric vehicle and battery module supply system therefor of claim 10, wherein each said battery module comprises a module status element associated therewith.

* * * * *